UNITED STATES PATENT OFFICE.

VIRGIL D. P. KENERSON, OF WORCESTER, MASSACHUSETTS, ASSIGNOR TO CHARLES HILL MORGAN, OF SAME PLACE.

ART OF WIRE-DRAWING.

SPECIFICATION forming part of Letters Patent No. 224,829, dated February 24, 1880.

Application filed February 13, 1879.

*To all whom it may concern:*

Be it known that I, VIRGIL D. P. KENERSON, of the city and county of Worcester, and Commonwealth of Massachusetts, have invented certain new and useful Improvements in the Art or Process of Wire-Drawing; and I do hereby declare that the following is a full, clear, and exact description of my said invention.

To enable those skilled in the art to which my invention belongs to practice my said improved process, I will proceed to describe it more in detail.

The wire to be drawn is immersed in or covered with a solution of salt of phosphorus, which is also sometimes called "microcosmic salt," and after said covering has been properly dried the wire is ready to be drawn through the drawing-dies in the usual manner.

I prefer to prepare the solution in a bath of sufficient size to contain a considerable quantity, and then immerse the coils of wire in such solution, which can be done very conveniently by proper machinery arranged for that purpose.

The mode of preparing the solution is to place in the bath a suitable amount of water, and then add and dissolve the materials until a solution of the proper strength is obtained, after which the wire is immersed in the solution, as before explained, and after the coating has dried and the crystalline coating becomes hardened the wire is ready to be drawn.

The coating or covering to the wire obtained in the manner above described is hard and adheres to the surface in a uniform manner, thereby promoting and facilitating the wire-drawing operation.

Having described my improved process in the art of drawing wire, what I claim therein as new and of my invention, and desire to secure by Letters Patent, is—

An improved method of preparing wire for drawing, consisting of coating or covering the wire, preparatory to being drawn, with a solution of salt of phosphorus, or microcosmic salt, substantially as and for the purposes set forth.

VIRGIL D. P. KENERSON.

Witnesses:
THOS. H. DODGE,
EDWIN E. MOORE.